United States Patent [19]

Gural

[11] Patent Number: 5,794,238

[45] Date of Patent: Aug. 11, 1998

[54] METHOD AND APPARATUS FOR ACCESSING A LARGE SCALE DATA ARRAY

[76] Inventor: Kenneth Gural, 2001 Jefferson Davis Hwy. #301, Arlington, Va. 22202

[21] Appl. No.: 448,646

[22] Filed: May 24, 1995

[51] Int. Cl.⁶ ........................................ G06F 17/30
[52] U.S. Cl. ........................ 707/6; 707/204; 283/81; 283/67
[58] Field of Search ...................... 392/600; 364/900; 283/21, 67, 81; 707/204, 6

[56] References Cited

U.S. PATENT DOCUMENTS

| | | | |
|---|---|---|---|
| 4,355,824 | 10/1982 | Weber et al. | 283/21 |
| 4,852,910 | 8/1989 | Taffer | 283/67 |
| 4,881,197 | 11/1989 | Fisher | 364/900 |
| 5,196,925 | 3/1993 | Takanashi et al. | 358/55 |
| 5,445,464 | 8/1995 | Asakura et al. | 400/249 |

Primary Examiner—Thomas G. Black
Assistant Examiner—Cheryl Lewis
Attorney, Agent, or Firm—Patentec

[57] ABSTRACT

A method and apparatus for manually and automatically accessing a plurality of data records in a large scale data array, comprising placing alphanumeric and other visually distinctive indicia on the exposed surface of the data records to be manually accessed; displaying a list of data records to be accessed; issuing a command to a drive controller to indicate the desired documents and data records to be accessed; determining that a desired data record is in a data drive; automatically transferring the desired documents between the drive and a buffer; ejecting the data record from the drive or otherwise indicating to the operator that the transfer is complete; and updating the displayed list of data records to remove those that have already been accessed; all without requiring an operator to input any keyboard information during the accessing cycle.

13 Claims, 5 Drawing Sheets

FIG. 2

METHOD AND APPARATUS FOR ACCESSING A LARGE SCALE DATA ARRAY

BACKGROUND OF THE INVENTION

1. Field of the Invention

The present invention relates to the field of data storage and retrieval, and in particular, to accessing data records in a large scale data array.

2. Description of the Prior Art

Due to the increasing availability of inexpensive data storage and retrieval equipment, and to the enormous information storage density available from digital image compression techniques and optical and magnetic disk technology, there is an increasing trend to store large quantities of information in digital records rather than on paper. A typical compact disk, for example, weighing only 10 grams, can easily hold tens of thousands of pages of facsimile document information, the equivalent of over 40 kilograms of printed paper. Thus, it is possible to replace complete bookshelves of information with small arrays of data records. And, it is possible to replace entire libraries of information with large arrays of data records. For example, a collection of 20 years of U.S. patents (approximately 1.5 million patent documents, or 20 million pages), when compressed using modified-modified-read+Huffman group 4 facsimile coding at 300 dpi, can be housed in a large array of approximately 1500 optical compact disks.

While vast amounts of information can readily be compressed into large arrays of data records, the problem still arises how to easily access the data records for storage and retrieval of information. The simplest method for accessing the data records is to house them in large racks from which a human operator can place them in a suitable data writing or reading machine (i.e., a "drive"), and thence return them to the racks. For such a system to be efficient, it is necessary to index the records in a form easily recognized by the human operator so that the operator may rapidly find the required record and return it back to the rack when the data access is completed. The indexing system should also allow easy discovery of incorrectly filed records.

A more complex and expensive system places the records in arrays, for retrieval by automated machines such as those known as "jukeboxes". The technology for jukeboxes being still young, currently available jukeboxes tend to be expensive, difficult to program and to incorporate into systems, and prone to mechanical breakdown. A jukebox containing only a portion of a large array, may incapacitate the entire array if the jukebox fails, because it may be necessary to access the documents in a particular order.

Perhaps the fastest and most expensive data retrieval comprises a complete array of drives, one drive for each record. Such a system, while fast in operation, takes up a considerable storage space due to the physical size of the drives and can be very expensive.

The question of which type of data accessing system to obtain depends in part on the type of data accessing to be performed. Thus, in a database searching system, wherein it is necessary to retain a data record in the drive for a considerable length of time, it may be advisable to use complete drive arrays. Alternatively, if the number of documents to be accessed is large, and each access requires only a few seconds because each document is small in size (say, only a few MBytes) then the system will perform best if the data record is rapidly retrieved and placed in the drive, for immediate data accessing to or from a data buffer, and rapidly returned to the rack to enable other records to be accessed. Therefore, for any system designed to access a large quantity of short documents efficiently in a large array of data records, the data records will be in the drives for only a short time. A useful measure of the performance of such a system is the Server Rate, or the number of documents that can be physically accessed in a unit time. The Server Rate is dependent upon a number of factors, such as the following:

Selection Time: time to select a data record from the rack

Transfer Time: time to move the data record from the rack to the drive

Spin-Up Time: time to insert the record into the drive and for the record to reach a sufficient rotational speed Data Access Time: time to access the data on the record Eject Time: time to spin-down and eject the record Return Time: time to return the record to the rack Multiplex Factor: the number of parallel drive operations that may be carried out simultaneously or in pipelined fashion.

The goal in designing a retrieval system for a large array of data records, therefore, is to maximize the Server Rate, maximize the reliability, and minimize the cost.

SUMMARY OF THE INVENTION

The present invention provides a complete system for rapidly and efficiently accessing a large array of data records, in a fashion which is inexpensive, free from large scale breakdown, and yet having a high bandwidth of data access. The present system accomplishes these goals by carefully reducing the times associated with the principal causes of delay in the data access, and by performing some of these operations in parallel and in pipelined fashion. With the use of computer-aided manual data servers and automated servers, the system enables rapid data retrieval at a fraction of the cost of a totally automated system.

BRIEF DESCRIPTION OF THE DRAWINGS

FIGS. 2–3B show arrangements and markings of the data records in the preferred embodiment.

DESCRIPTION OF THE PREFERRED EMBODIMENT

Figure 1:
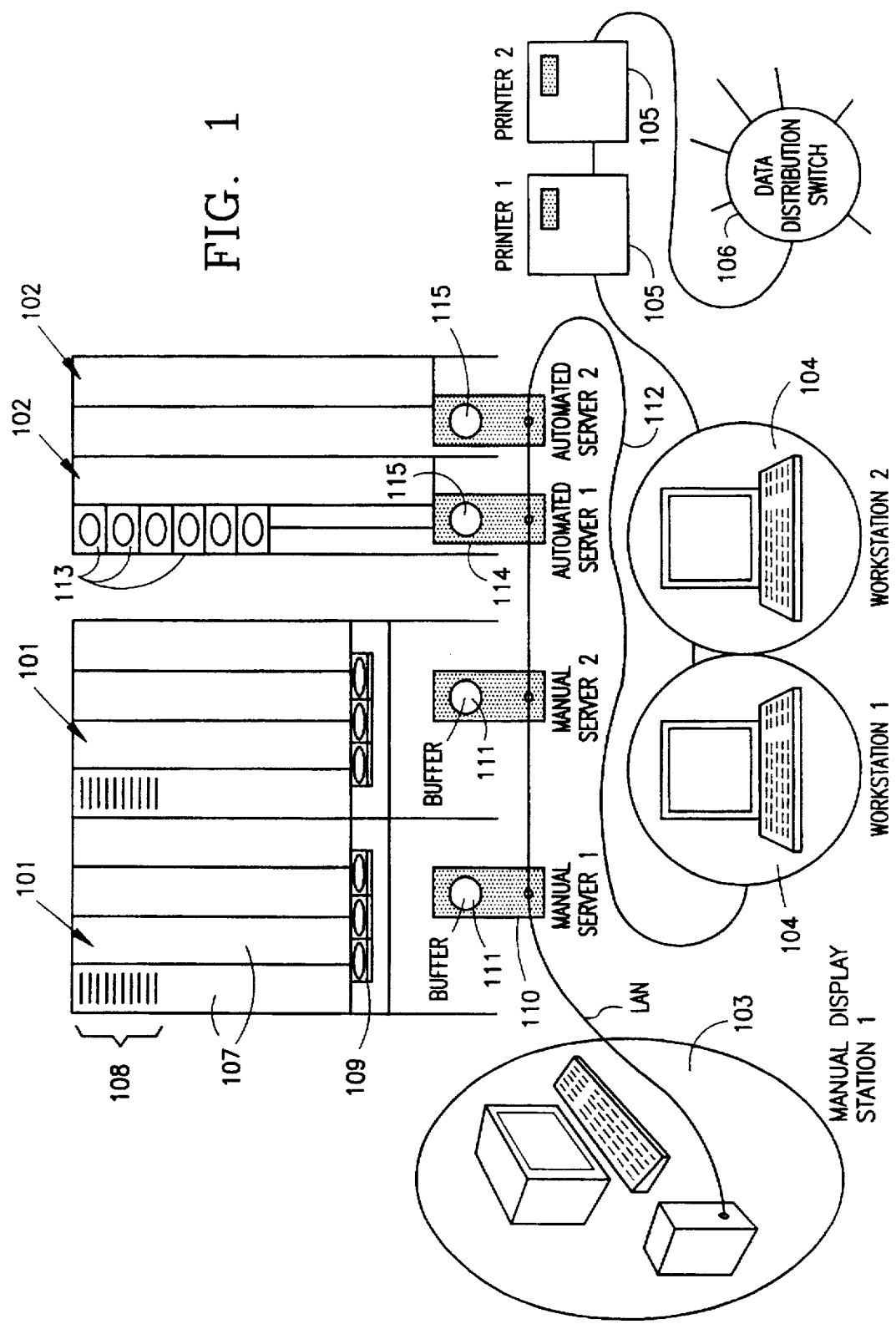
FIG. 1 shows the overall system of the preferred embodiment.

FIG. 1 shows the basic design of the preferred embodiment of the present invention. A plurality of manual server stations 101 and automated server stations 102 are linked with a plurality of system control and/or manual display stations 103 and a plurality of low utilization speed client stations such as display workstations 104, printers 105, and other data clients (not shown) such as facsimile servers, document image processors, and document scanners; which are further linked to additional data clients, possibly through one or more high speed data distribution switches 106. The low utilization speed client stations such as workstations 104 and printers 105 obtain data in spurts over one or more communication networks 112 from the servers 101 and 102. The manual servers 101 comprise a plurality of data records 108 housed in racks 107, a plurality of data drives 109, and a controller 110. In the preferred embodiment, the drives 109 are located in close proximity to the data records 108, and in view of the system control station 103. The automated servers comprise a plurality of automated devices 113 which may be jukeboxes or individual drives (possibly including fixed hard disk drives), and a controller 114. The jukeboxes or drives 113 may be connected directly to the communication network 112 without passing through controllers 114, or may be buffered by controllers 114. In order to maximize throughput of the system, each of the servers comprises a large capacity data buffer 111, 115. Each of the drives 109, automated devices 113 and low utilization speed client stations 104, 105, etc. may also contain data buffers (not shown).

While the large data array system of the present invention is shown as a hybrid of both manual and automated data record servers, it can also operate using only a manual or only an automated server. For example, a manual system capable of printing documents housed within a large plurality of optical disks can be built using a single controller 110 along with several data read only drives 109, control stations 103 and printers 105. By means of multiplexing techniques and other efficiencies to be described below, such a manual server system can operate faster than commercially available jukeboxes costing many times as much.

Figure 2:
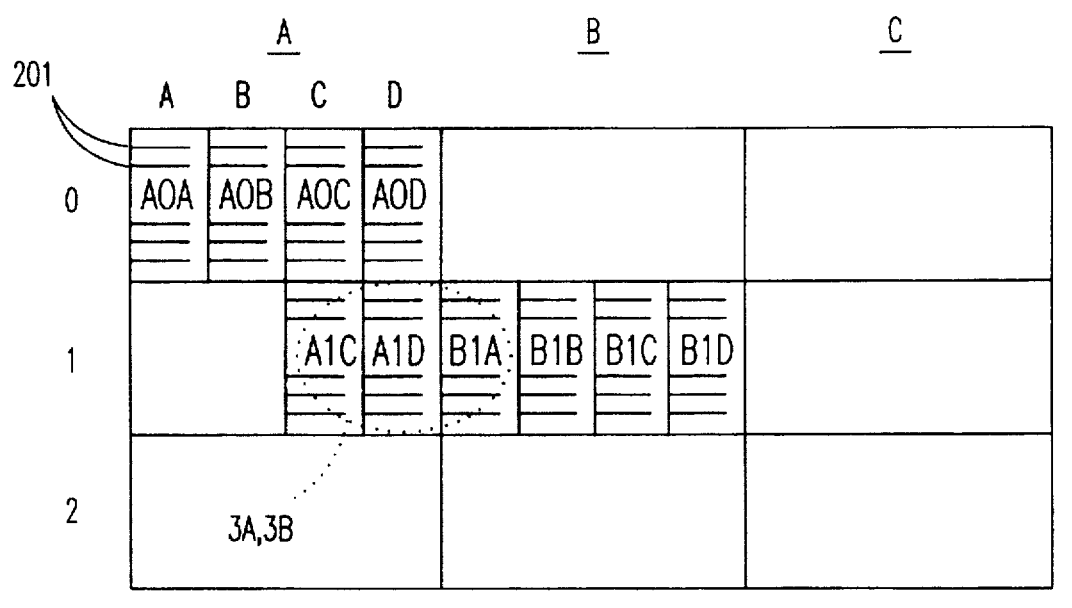

With respect to the manual server, in order to make the data records easy to retrieve, manipulate, place in the data drives and return to the racks in the proper locations, the data records in the preferred embodiment are divided on the racks into a plurality of logical blocks having alphanumeric names such as "A0A", "B1A", etc. as shown in FIG. 2. Each logical block comprises a serial array of data records, as indicated schematically in FIG. 2 by the short horizontal lines 201. The left-most character in the data block name (e.g., "A" in "A0B") represents the global column as indicated at the top of FIG. 2. The central digit represents the global row as indicated on the left of FIG. 2. The third letter (e.g., "B" in "A0B") represents the local column within the larger block defined by the first letter and the second number, as indicated at the top of FIG. 2. The string of alternating alpha and number designations may be continued to additional alphanumeric digits according to the numbers of records to be housed in the array.

Figure 3A:
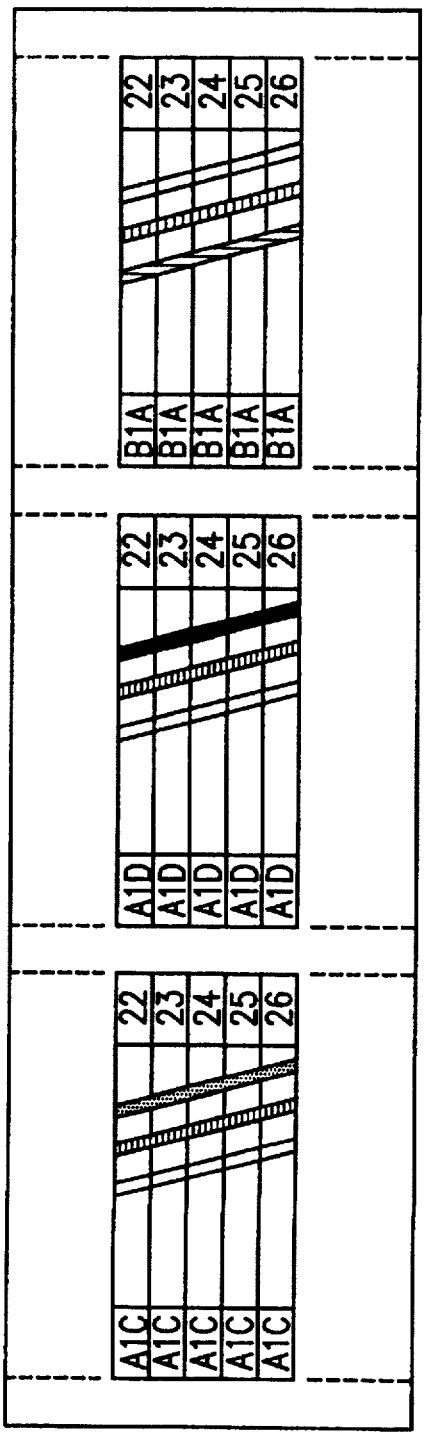
Figure 3B:
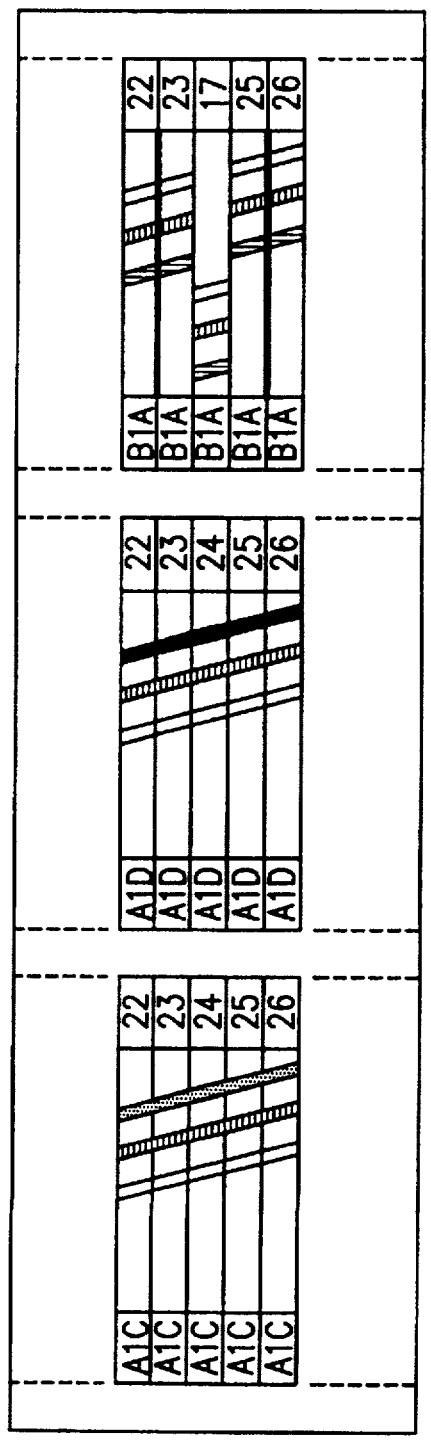

An enlarged view of the data record array, corresponding to the dashed region in FIG. 2, may be found in FIGS. 3A and 3B. In these figures, the individual data records may be seen, each record carrying the logical block name (e.g., "A1C") and a serial record number within the block (e.g., "23"). Thus, each data record may be uniquely identified by a labeling system comprising a string of successive letters and numbers corresponding to ever-diminishing granularity of data blocks. For the numbering scheme outlined above, using the letters A–F for the first and third elements in the data record name, the digits 0–2 for the second element, and the numbers 0–29 for the fourth element, the total number of data records is 3240. If each data record comprises 0.6 Gbyte of data, the total amount of data housed in such a large array is nearly 2 Tbyte of data.

To further accelerate the speed of selection and return of the data records in the manual server, the preferred embodiment of the invention includes color coding of the data records as shown in FIGS. 3A and 3B. Each data record contains a plurality of color stripes, preferably one for each of the alphanumeric characters in the block name for the record (with the exception of the final row number). Thus, the record "A1C-23" contains three stripes for the characters "A", "1", and "C". In the preferred embodiment, the colors used for the striping are simply chosen in correspondence with the alphanumeric characters in the record's block name (much as the color stripes on a resistor represent the successive digits in the resistor's ohmic value). Thus, if "A" is chosen as "WHITE", "1" as "BLUE", and "C" as "ORANGE", then the striping pattern for all of the records in the block "A1C" will be WHITE, BLUE, ORANGE. Similarly, with "D" corresponding to BLACK, the next data block "A1D" will have the striping pattern WHITE, BLUE, BLACK. However, despite the use of the same color sequence in the striping pattern for all data records within a logical block, each of the data records within a block have a unique color striping pattern, because the location of the striping on each record is also offset according to the row number, as shown in FIG. 3A.

The significance of offsetting the striping will be seen in conjunction with FIG. 3B, wherein the data record B1A-17 is mistakenly replaced into the slot for B1A-24. By means of the offset location of the color stripes, the mistake is easily apparent from a distance. Further, because each block contains a unique set of color stripes as compared with any other block, if two data records from differing blocks are transposed, the mistake will be easily visible due to the lack of continuity in the colors of the data stripes within each block (even if the transposed records contain stripes in the same offset position). In prior indexing systems, for example as taught in U.S. Pat. No. 4,355,824 to Weber et al, a single stripe was employed across a plurality of data records to enable easy recognition of an out-of-place record. However, when the number of data records is very large, as in a large scale array, a single stripe will not be sufficient to uniquely code the data records, because the offset of the stripe from one record to the next will force the diagonal line to leave the records before all records are covered. Thus, a color indexing system for a large scale array of data records must employ a complex pattern such as a plurality of color stripes, as described above.

In fact, the striping system derives its value from the fact that straight lines and deviations therefrom are easily visible from a distance. The invention can also work if other striping patterns are employed, such as a plurality of lines with uneven widths and/or spacing (e.g., bar codes), differing angles, etc. (not shown in the drawings). In addition, the striping pattern may be replaced with other visually identifiable patterns, such as pictures, high contrast drawings, etc. All that is required is that a misplacement of plural data records cause sufficient distortion of the pure image so that the misplaced records will stand out.

While the color indexing system of the present invention may at first seem to be only a simple innovation, it proves quite powerful in helping human operators accurately locate and replace data records within the data racks.

Moreover, since the data records to be successively retrieved are frequently physically proximate to each other in the data racks, the color indexing is especially useful, since simultaneous removal of plural records in close proximity is one of the main causes for misplaced records (upon return of the records). However, with complex pattern indexing, any misplaced records can be readily seen and corrected.

In the case of the manual server, by keeping the steps involved in selection and retrieval of the data records simple and streamlined, it is possible to achieve a high Server Rate and consequently high throughput. For example, all requests for documents are translated by the system control 103 into the appropriate record block and number name, so that the operator can readily find the record using the simple schema of column, row, column ... with increasingly finer resolution (as described above), without requiring knowledge of the name or contents of the document. Further, the requests for documents may be rearranged to enhance maximum coincidence of documents on the same record, or to place successive documents in a neighboring vicinity on the rack so that the operator may retrieve multiple records with a single pass of the hands.

In the case of optical compact disks (having a height of approximately ½ inch when housed in standard caddies), an operator can readily select as many as 10 disks at a time from the racks and move them simultaneously to the vicinity of the data drives 109. Thus, as soon as a data drive is available, a disk can be inserted into the drive, and with little delay. In essence, the human operator acts like a robot arm for retrieving the disks, and the hands of the operator act like a record storage buffer to hold the records in the proximate vicinity of a drive until the drive becomes available. If the Spin-Up and Data Access times of the record are significant (e.g., 5–10 seconds), then the human operator has sufficient time to retrieve several data records while the drives are engaged with previous records. Thus, the time for the operator to insert a new record into a drive once it becomes available may be only a few seconds, because the record can be inserted into the drive immediately when the drive becomes available. By contrast, most commercially available CD jukeboxes require 5–30 seconds for retrieval and insertion of a new data record.

Additional economies in time and increased Server Rate can be obtained by using multiple drives that operate in parallel. Due to data buffering available in conventional drives, plural drives can share even the same data bus to the controller 110 without decrease in performance. For data records that require significant Spin-Up time and/or time to locate and access the document on the data record, the use of multiple drives can allow some of the drives to be spinning-up while other drives are actively accessing the data on their records; thereby ensuring a continuous stream of data from the manual server.

Figure 4A:
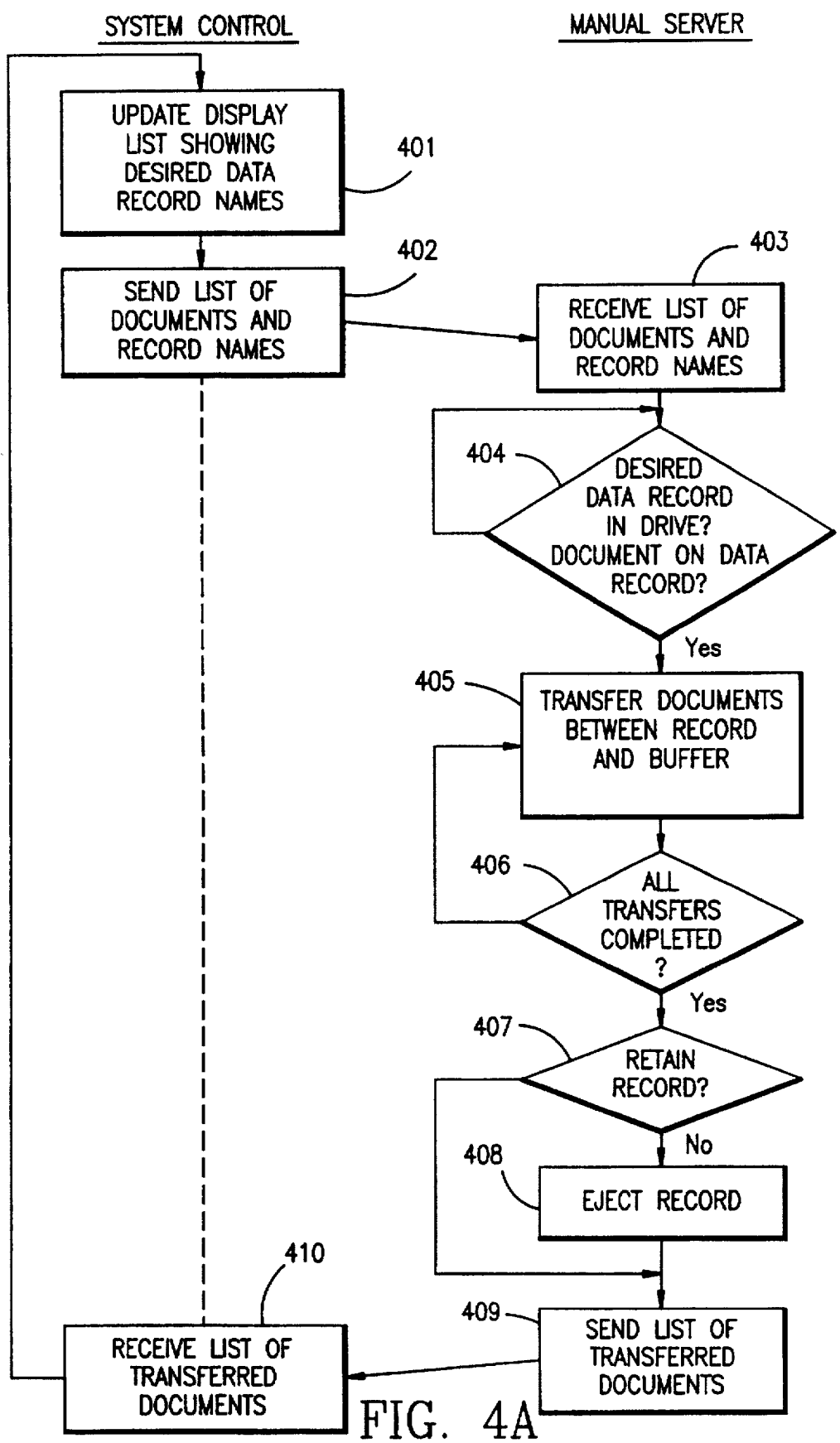
FIGS. 4A–4B show typical control sequences in the preferred embodiment.

In operation of the preferred embodiment as shown in FIG. 4A, the system control station 103 displays a list of desired documents and their corresponding data records (using the alphanumeric block names described above). The list of desired documents is assembled from the various client workstations and other devices 104–106. The list of desired documents and corresponding data records is also sent to the manual server, steps 401–403. The operators, viewing the displayed list of data records, retrieve a plurality of the designated data records and insert some of them in whichever drives are available. The manual server receives the list of documents and data records 403, and checks each available drive to identify which data records are present. For each data record, the manual server uses the document information to perform the desired transfer of information between the data record and buffer 111 (or to/from another network location as specified by the system controller), in steps 405–406. As soon as the copying is completed, the manual server issues a software eject to eject the data record if so desired (steps 407–408) or otherwise indicates to the operator by visual or audible means that the transfer is completed, and issues a command to the system controller to indicate which documents (and corresponding data records) have been successfully accessed. The system controller then automatically removes the data records from the list of desired data records and updates the displayed list to show additional data records to retrieve (if there are any, steps 410, 401). The system controller also coordinates the transfer of the data between the buffer 111 (or other network data buffers) and the appropriate client devices 104–106 according to their data needs. For example, the system controller may maintain lists of transferred documents, and poll the client devices (or receive signals from the client devices) to determine when additional documents are needed. The system controller may then cause the documents to be transferred from their temporary buffer to the client devices. Alternatively, the client devices may maintain control of the list of needed documents, and cause them to be transferred at the moment they are needed. Or, the manual server may transfer the documents directly from the data records to the client devices over the network 112.

Figure 4B:
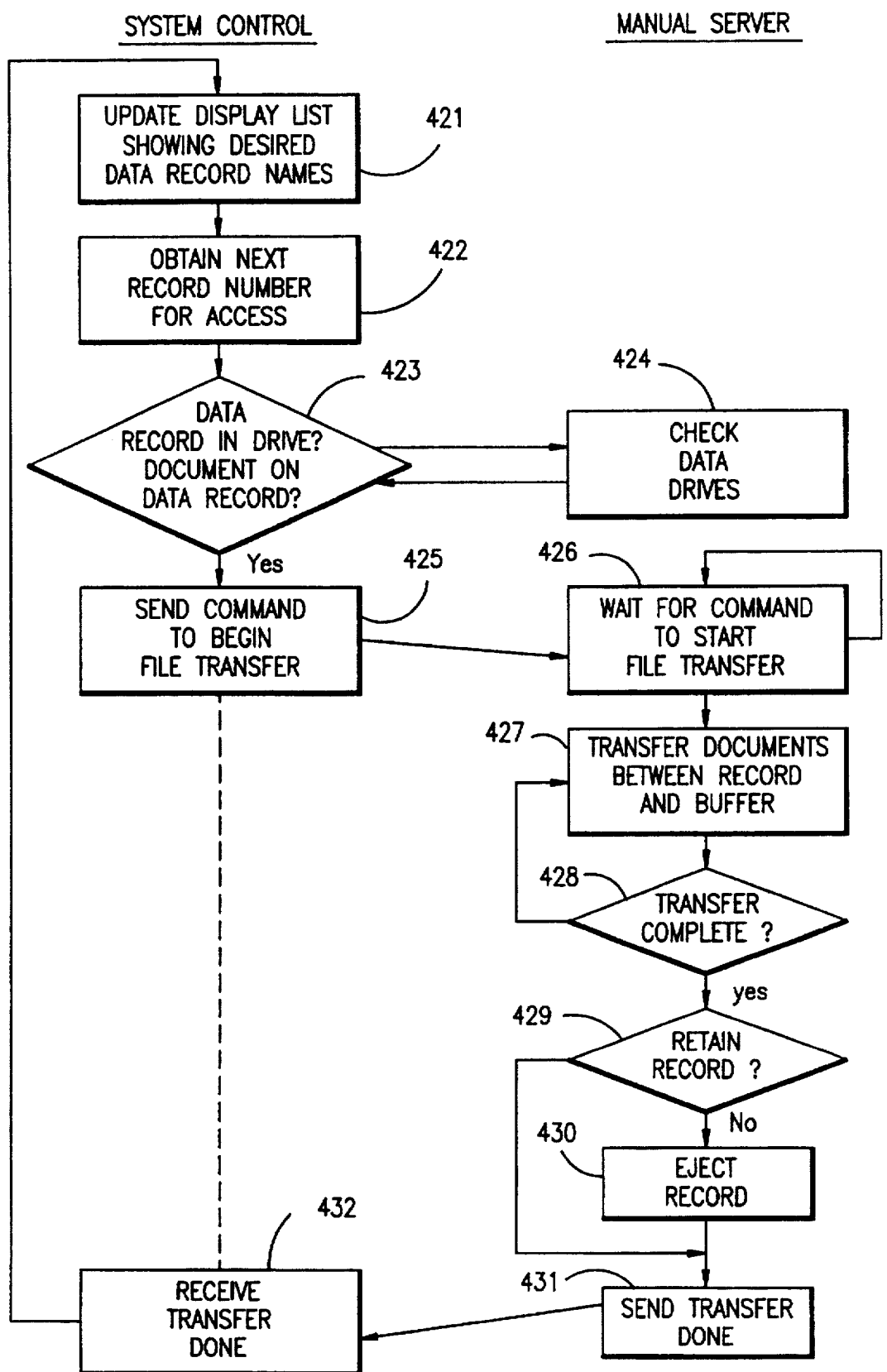

In another embodiment of the invention, as shown in FIG. 4B, some of the control functions are retained by the system control rather than the manual server, but the basic overall operation is the same as in FIG. 4A in that the system controller causes the manual server to transfer documents on demand. One advantage of the embodiment of FIG. 4B is that the system control will know immediately in step 423 if there is a problem with the record placed in the drives; but at the expense of additional network traffic.

By using the methods of FIGS. 4A or 4B, the operator for the manual server sees a list of data records, retrieves the records, places them in the drives, waits for the records to be ejected, removes the ejected records, and places additional records into the drives that were emptied when data records were previously ejected. Since the operator is not required to perform any keyboard actions between data records (for example, since it is not necessary to press a button marked "next"), the operator is capable of retrieving the data records at high speed so that a new data record can be available and waiting in the vicinity of a drive when the server ejects the previous record. The resulting wait time for each drive (the time during which it contains no record) can be short, perhaps a few seconds. With multiplexed drives, automatic ejecting, color-coded indexing, simple record naming to indicate rack location, buffering of the retrieved data records (in the operator's hands) and automatic advance of the retrieval list, it is possible for a manual server to outperform even expensive jukebox systems.

In a further embodiment of the invention (not shown), the system control may maintain an accounting database to charge for accessing the documents. Thus, in a multi-user environment, the client devices may generate lists of documents to be charged against particular accounts. The system control sets up a local accounting process to monitor the document accessing for each batch of documents, and begins the accessing process as described above. After each cycle of retrieving records, culminating in receiving the signal from the manual server that the accesses completed properly, the system control causes the local accounting function to be incremented indicating the amount of server usage in that cycle (e.g., the number of documents or pages accessed or the amount of server time employed). Upon completing all accesses within a batch of documents, the system control may cause the accumulated accounting information to be transferred to an accounting database to update the corresponding usage accounts. The system control may also maintain counts of document retrieval for diagnostic or other maintenance purposes.

A careful analysis of the above discussion shows that some of the benefits that enable the manual server to be time-effective (such as multiplexed buffered retrieval of the data records) may be equally effective in reducing the wait time in fully automated systems as well. Thus, for example, a jukebox comprising a plurality of drives that feed from and eject into one or more physical record buffers, and a retrieval mechanism (e.g., robot arm or the like) that transfers the records from the rack to and from the physical buffers, may be able to reduce the wait time of each drive from the conventional time required to return a record to the rack and retrieve the next record, to the time simply to move the record between the physical record buffer and the drive, which may be considerably shorter due to the shorter distance to be traveled. Also, allowing the retrieval mechanism to select and return multiple records on a single pass while transferring them in parallel to and from the record buffer can further speed the throughput of the automated system. In addition, careful arrangement of the record requests to cause plural requests to coincide on the same data record or on records in proximate vicinity on the rack can further increase the speed of the automated systems. Thus, some of the principles of the present invention, while described in the context of a manual server system, apply to automated servers as well.

The preferred embodiment of the invention includes a hybrid of manual and automated servers. Thus, the automated servers, if faster than the manual servers, can be used for the data records accessed most frequently, and/or for data records that must be accessed during times of the day when the operators of the manual servers are not present. The manual servers may be used for the less frequently accessed records, and/or for backing up the automated records with a redundant set.

While the present invention has been described in terms of a preferred embodiment comprising a hybrid manual and automated server system, having specific control sequences for performing the document file transfers, it should be clear to those skilled in the art that variations of the preferred embodiment may be readily devised that should rightly come under the scope of the invention. Therefore, the invention should only be limited by the claims appended herewith.

What is claimed is:

1. A method for indexing discrete data records, comprising:
    a) separating the data records into logical blocks, each block containing a plurality of data records having a particular sequential relationship;
    b) assigning a unique sequence of colors to each block; and
    c) for each data record within a block, placing color stripes on said data record with the colors chosen in accordance with said unique sequence of colors, and with the position of the stripes chosen in accordance with said particular sequential relationship.

2. The method of claim 1 for indexing discrete data records, further comprising:
    a) assigning a unique alphanumeric block name to each block;
    b) assigning a unique alphanumeric record name to each data record within a block in accordance with said particular sequential relationship; and
    c) placing, in addition to said color stripes, said alphanumeric block name and said alphanumeric record name on said data record.

3. The method of claim 2 for indexing discrete data records, wherein said step of assigning a unique sequence of colors to each block comprises establishing a color concordance between colors and characters in said alphanumeric block name, and determining for each block the sequence of colors on the basis of said color concordance.

4. A method for indexing a plurality of data a records housed in a rack, comprising:
    a) logically separating the data records in to blocks, each block containing a plurality of data records having a particular sequential relationship;
    b) assigning a unique visual pattern to each block, said visual pattern comprising at least two visible objects; and
    c) for each data record within a block, placing a portion of said unique visual pattern on an exposed surface of said data record in such a fashion that when the data records are properly placed in the rack, the exposed portions of the data records align to display said unique visual pattern; and in such a fashion that said visible objects span at least two of said data records.

5. The method of claim 4 for indexing a plurality of data records, further comprising:
    a) assigning a unique alphanumeric block name to each block;
    b) assigning a unique alphanumeric record name to each data record within a block in accordance with said particular sequential relationship; and
    c) marking said alphanumeric block name and said alphanumeric record name on the exposed surface of said data record in addition to said unique visual pattern.

6. A large scale array of discrete data records, wherein the data records are divided into logical blocks of data records, each block of data records having an associated unique visual pattern containing at least two visible objects; wherein each data record within said block of data records carries a unique portion of said unique visual pattern, and wherein said visible objects span at least two of said data records.

7. The large scale array of discrete data records of claim 6, wherein each logical block of data records has an associated unique alphanumeric block name, and each data record carries said unique alphanumeric block name corresponding to its logical block and a unique alphanumeric record name distinct from other data records that are in the same logical block.

8. The large scale array of discrete data records of claim 6, wherein said unique visual pattern comprises a pictorial image.

9. A computer-aided method for accessing discrete data records housed in a large scale array of data records, comprising:
    a) displaying a list of data records to be accessed;
    b) retrieving at least one data record from said large scale array;
    c) holding said data record until a record accessing device becomes available, and placing said data record into said record accessing device;
    d) checking said data record to ensure it is a data record to be accessed, and if so, accessing the data in said data record;
    e) automatically updating said list of data records to be accessed to remove said data record from said list, and to add to said list any additional data records to be accessed.

10. The computer-aided method of claim 9 for accessing discrete data records housed in a large scale array of data records, comprising the further step of automatically ejecting said data record from said record accessing device immediately after accessing the data in said data record.

11. The computer-aided method for accessing discrete data records of claim 9, wherein said step of retrieving comprises retrieving a plurality of said data records, and said step of holding comprises simultaneously holding said plurality of data records.

12. An array of discrete data records, wherein the data records are divided into logical blocks of data records, each block of data records having an associated unique pictorial image; wherein each data record within said block of data records includes a visible edge carrying a unique portion of said unique pictorial image, so that when said data records are aligned and placed in the proper sequence to expose said visible edges, the unique portions of said unique pictorial image will also be aligned to produce a composite image of said unique pictorial image, wherein said pictorial image comprises a background and at least two visible objects, such that said at least two visible objects span at least two of said data records.

13. The array of discrete data records of claim 12, wherein each logical block of data records has an associated unique alphanumeric block name, and each data record carries said unique alphanumeric block name corresponding to its logical block and a unique alphanumeric record name distinct from other data records that are in the same logical block.

* * * * *